Patented Feb. 7, 1933

1,896,627

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

CATALYTIC OXIDATION OF AMMONIA

No Drawing.     Application filed March 22, 1929. Serial No. 349,275.

This invention relates to the catalytic oxidation of ammonia to oxides of nitrogen.

In the past ammonia has been oxidized to oxides of nitrogen at elevated temperatures by means of air or other oxidizing gases in the presence of contact masses, usually platinum gauze. The present invention is directed to the catalytic oxidation of ammonia in the presence of a new class of contact masses. The contact masses used in the present invention are the acid leached products of base exchanging bodies, either zeolites or non-siliceous. The base exchange bodies which are acid leached may be of the ordinary two-component zeolite type, that is to say the reaction product of a silicate with either one or more metallates or one or more metal salts, or they may be multi-component zeolites which are the reaction products of at least one silicate, at least one metallate and at least one salt the basic radical of which is a metal capable of entering into the non-exchangeable nucleus of a zeolite. The unleached multi-component zeolites, diluted or undiluted, are described in my prior Patent No. 1,728,732, dated September 17, 1929. The non-siliceous base exchange bodies are described in my prior Patent No. 1,694,122 dated December 4, 1928.

The base exchange bodies or their derivatives produced by introducing other bases by base exchange or by causing the base exchange body to react with a compound containing an anion capable of reacting therewith to form a salt-like body will be referred to generally as "permutogenetic bodies".

The catalytically active components may be associated in or with the permutogenetic bodies, diluted or undiluated in five main forms:—(1) They may be physically admixed or impregnated into the permutogenetic body. (2) They may be physically, homogeneously incorporated into the permutogenetic bodies before the latter have been completely formed, acting as catalytically active diluents or diluents which have been impregnated with catalytically active substances. (3) They may be chemically combined in the permutogenetic body in non-exchangeable form, that is to say they may form part of the non-exchangeable nucleus of the permutogenetic body. (4) They may be chemically combined in exchangeable form either during or after formation of the permutogenetic body. (5) They may be chemically combined with the permutogenetic body in the form of catalytically active anions which have reacted with the base exchange body to form a salt-like body. Obviously, of course, the same or different catalytically active components may be present in more than one of the above described forms, and it is an advantage of the present invention that catalytically active substances may be introduced in a wide variety of forms which gives a wide field of choice to the catalytic chemist.

While four of the methods of combination of catalytically active substances may be effected with undiluted as well as diluted permutogenetic bodies, I have found that for the catalytic oxidation of ammonia the diluted permutogenetic bodies present many advantages, particularly where the diluents are of a physical nature such as to exert a desired influence on the catalytic activity of the contact masses as when, for example, the diluents by reason of high porosity, capillarity or surface energy may be considered as physical catalysts or activators.

The permutogenetic bodies described above are treated with dilute acids either mineral or organic and this leaching process removes part or all of the exchangeable base present which is usually alkali or, if carried further, part of the basic portion of the nucleus of the permutogenetic body is likewise removed. Contact masses of remarkable effectiveness are thus obtained by reason of the desirable physical structure of the leached permutogenetic bodies and the wide limits of homogeneous dilution of catalytically active molecules with resulting uniformity and smoothness of action which is of great importance.

Another important advantage of the contact masses containing leached permutogenetic bodies lies in the fact that these contact masses are extremely resistant to high temperatures, especially when most or all of the exchangeable alkali has been leached out. As the oxidation of ammonia requires very high temperatures, this characteristic of the contact masses of the present invention is of great practical importance.

The leaching of the permutogenetic bodies transforms exchangeable alkali into compounds of the alkali-forming metals which act as stabilizers for the reaction. These stabilizers may be non-alkaline, weakly alkaline, or strongly alkaline, depending on the extent to which the leaching is carried out.

In addition to the presence of stabilizers, which are important in connection with many of the contact masses used in the present invention, it has been found that the stabilizer action and the overall efficiency of the contact masses can in many cases be greatly increased or enhanced by the association therewith or chemical combination therein of elements or radicals or groups which are catalytically active but which do not possess specific catalytic activity for the oxidation of oxides of nitrogen. Thus, for example, it will be noted that the reaction involves the production and splitting off of water. For this reason it is desirable in many of the contact mass compositions of the present invention to incorporate or include catalysts or catalytic components which are not specific catalysts for the oxidation of ammonia to the oxides of nitrogen but which may favor dehydration. In other cases different non-specific catalysts may be used and are of importance. Thus, for example, when coal tar ammonia is being oxidized, it is necessary to burn out the organic impurities present and while some catalytic components which are oxidizers of ammonia to oxides of nitrogen also favor the selective catalytic combustion of organic impurities, in other contact masses components may be incorporated which favor the selective catalytic combustion of organic impurities or their transformation into compounds which are harmless or easily separated from the final product, which component may not be specific catalysts for the oxidation of ammonia to oxides if nitrogen, at least at the reaction temperatures used. In this connection it should be noted that the effectiveness of different catalytic components will vary with the temperature at which the reaction takes place and that at one temperature a component may be a specific catalyst whereas at another temperature, frequently a lower reaction temperature, the particular component may no longer be a specific catalyst. These non-specific catalysts will be referred to throughout the specification as "stabilizer promoters" and the expression is intended to have no other meaning. The concept of stabilizer promoters is, therefore, not intended to define the chemical individuals or groups but is relative and refers to the action of the catalytic groups under the reaction conditions obtaining. The use of the expression "stabilizer promoter" should in no sense be taken to limit the invention to a particular theory of action of these non-specific catalysts and in fact in some cases stabilizer promoters may be present where there are no stabilizers.

The tremendous range of chemical groups which may be combined in or with the leached permutogenetic bodies permits a wide choice of stabilizer promoters as well as specific catalysts and permits their association with the contact masses in an extremely homogeneous and catalytically efficient form.

The formation of the base exchange bodies is, of course, carried on in the usual manner as, for example, according to the descriptions of my prior patent and application referred to. The present invention does not depend for its patentability on any particular method of forming the base exchange body.

While, as has been stated above, the present invention includes ammonia oxidation processes in which either diluted or undiluted leached permutogenetic bodies are used, it is preferable in most cases to utilize diluted leached permutogenetic bodies in the contact masses for carrying out the present invention. It is desirable, although not essential, that the diluents be homogeneously incorporated into the leached permutogenetic bodies before formation of the latter or at least before the leached permutogenetic body has set after formation. Many diluents, inert, stabilizing, activating, catalytically active, or having stabilizer promoter effects, can be used. A few of the diluents will be briefly enumerated:—powdered base exchange bodies, natural or artificial powders of rocks, stones, tuffs, trass, lava, and similarly volcanic products which are frequently highly porous, greensand, pulverized slag wool, cements, sand, pulverized earthenware, fuller's earth, talc, glass powder, pumice meal, asbestos, graphite, activated carbon, quartz meal, various pulverized minerals rich in quartz, metal powders and metal alloy powders, salts of oxymetal acids such as tungstates, vanadates, chromates, uranates, manganates, cerates, molybdates, etc., particularly copper, iron, silver or thorium salts of the above, silicates, such as copper silicate, iron silicate, nickel silicate, cobalt silicate, aluminum silicate, titanium silicate, zirconium silicate, minerals or ores, especially those rich in copper and iron, etc. Finely divided diluents are of great advantage, especially when the average particle size is less than 60 microns, in which case the diluents possess high surface energy, which increases the absorptive and adsorptive capacity of the contact mass, the diffusion speed and porosity. These finely divided diluents may be considered as physical catalysts or activators. Diluents or undiluted base exchange bodies or their derivatives, siliceous or non-siliceous, may be finely divided and used as part or all of the diluents of the leached permutogenetic bodies used in the contact masses of the present invention.

While the invention is in no sense limited to any particular method of introducing diluents, they are preferably introduced by one of the nine methods described in connection with zeolites in my prior Patent No. 1,694,123 dated December 4, 1928.

The nucleus or non-exchangeable portion of the molecules of the leached permutogenetic bodies may be considered to contain two types of oxides, namely, relatively basic metal oxides, usually amphoteric, and relatively acidic oxides, such as $SiO_2$ and certain other oxides of similar properties which can replace part or all of the $SiO_2$. The nucleus behaves as a single acid radical and cannot be split by ordinary chemical means without far reaching decomposition but it is advantageous to consider the two portions of the nucleus as basic and acidic portions, bearing in mind, of course, that the nucleus behaves as a single group. The metal components which are capable of forming the basic portion of the nucleus are salts or metallates of the following metals:—copper, silver, gold, bismuth, beryllium, zinc, cadmium, boron, aluminum, titanium, zirconium, tin, lead, thorium, niobium, antimony, tantalum, chromium, molybdenum, tungsten, uranium, vanadium, manganese, iron, nickel, cobalt, platinum, palladium. Compounds of these elements may be introduced singly or in mixtures in any desired proportions, and may be in the form of simple or complex ions. It should be understood that some of the elements in certain stages of oxidation may be introduced either as metallates or metal salts. Others may be introduced in only one form, and still others may be introduced in a stage of oxidation other than that desired in the final base exchange body or in the form of complex compounds. Among the complex ionogens are ammonia, hydrocyanic acid, oxalic acid, formic acid, tartaric acid, citric acid, glycerine, and the like.

Many of the metals are specific catalysts for the oxidation of ammonia, others are stabilizers and still others are stabilizer promoters. The status of an element as catalyst or stabilizer promoter may vary with the particular reaction conditions and with the nature of the contact mass.

Examples of components forming the relatively acid portion of the leached permutogenetic bodies nucleus are alkali metal silicates, which are soluble in alkali, and alkali metal salts of acids, such as those of boron, phosphorus, nitrogen, etc.

The exchangeable bases of the leached permutogenetic bodies may be substituted by base exchange, and the elements which can be introduced singly or in admixture by base exchange are the following:—copper, silver, gold, ammonium, beryllium, calcium, manganese, zinc, strontium, cadmium, barium, lead, aluminum, titanium, zirconium, tin, antimony, thorium, vanadium, thallium, bismuth, chromium, uranium, manganese, iron, cobalt, nickel, palladium, platinum, and cerium.

The exchangeable bases introduced may be specific catalysts, they may be stabilizers, or they may be stabilizer promoters. They may be introduced as simple ions or as complex ions and may enhance the catalytic activity of the final contact mass, improve its physical strength, or both.

Leached permutogenetic bodies may also be coated in the form of films on massive carrier granules or may be impregnated therein. The massive carriers may be inert, activating, or themselves catalysts.

The present invention may be carried out as a single catalytic reaction, namely, the oxidation of ammonia to oxides of nitrogen, and where a pure ammonia, such as, for example, ammonia catalytically synthesized from its elements, is used this will be the normal reaction. It is, however, an advantage of the present invention that effective composite contact masses may be used and impure ammonia can be oxidized with concomitant selective transformation of impurities into easily separable or unobjectionable products. Thus, for example, ammonia produced as a by-product from the distillation of coal, wood, and other products is normally contaminated with considerable amounts of organic impurities or impurities containing sulfur, either inorganic, such as hydrogen sulfide, or organic. It is quite common for such by-product ammonia to contain considerable amounts of phenols. When such an impure ammonia is passed over a suitable contact mass containing a leached permutogenetic body the organic and other impurities are oxidized to easily separable or harmless products and at the same time the ammonia is oxidized to oxides of nitrogen. Naturally, of course, the reaction may or may not be absolutely simultaneous and there is reason to believe that with composite contact masses a selective oxidation of impurities takes place before the ammonia is oxidized. In some modifications of the present invention it is also desirable to arrange the catalyst in zones, for example, permitting gases first to encounter the contact masses which favor the selective oxidation of impurities and then to encounter a contact mass which permits the oxidation of ammonia to oxides of nitrogen. The zones may be separated or contiguous.

The present invention is not concerned with a particular temperature and the temperature ranges which have been used with other contact masses and which normally run from 500–800° C. may be employed and the optimum temperature will of course depend on the precise nature of the contact mass utilized. The proportions of reacting ingredients may also vary and the reaction may be carried out at atmospheric pressure or at pressures above or below the atmosphere. A few representative processes coming within the scope of the present invention will be set forth in greater detail in the following specific examples, it being clearly understood that the invention is not limited thereto.

Example 1

The following three solutions are prepared:
1. 24 parts of $SiO_2$ in the form of 33° Bé. sodium waterglass solution are diluted with 6–7 volumes of water.
2. A 5% sodium aluminate solution is prepared from a corresponding aluminum nitrate solution containing 5 parts of $Al_2O_3$.
3. 50 parts of ferric nitrate with 9 mols of water are dissolved in water to form a 10% solution.

50 parts of a mixture of rare earths, monazite sand or monazite sand refuse are added to solution 1 and then the aluminate solution is poured in with vigorous agitation. To this mixture is then added sufficient ferric nitrate solution so that a slight alkalinity to phenolphthalein remains, the addition to be effected with vigorous stirring. The gelatinous precipitate obtained is a three-component zeolite containing aluminum and iron in non-exchangeable form and rare earths embedded as diluents. The gel is separated from the mother liquor by pressing, is thoroughly washed with water, dried at temperatures preferably below 100° C., and the cake broken into pieces.

A dilute solution of ½ to 2% hydrochloric or sulfuric acid is trickled over the fragments of the zeolite until substantially all of the exchangeable base has been removed. The fragments are then washed with water, dried, and filled into a converter, whereupon a mixture of ammonia and air, containing 5–15% of ammonia is passed over the contact mass at 650–850° C., good yields of nitrogen oxides being obtained.

Example 2

Instead of a three-component zeolite as described in Example 1, a two-component zeolite may be prepared by using corresponding amounts of an aluminum nitrate solution instead of the sodium aluminate solution. The aluminum nitrate solution is mixed with the ferric nitrate solution so that one part of the ferric nitrate is present for each part of aluminum oxide. The amount of ferric nitrate-aluminum nitrate solution added may be slightly less than in Example 1 as the aluminum nitrate is acid rather than alkaline. The contact mass is leached in the same manner as described above.

Example 3

(1) 50 parts of freshly precipitated iron oxide are prepared by adding 5–6% ammonia to a 10–15% ferrous nitrate solution at 40–50° C. until the reaction is ammoniacal. The finely divided iron oxide is washed with distilled water to remove the ammonium nitrate and dried at temperatures below 100° C.

(2) 24 parts of lead dioxide in the form of sodium plumbite are dissolved in water to form a 5% solution.

(3) 5 parts of aluminum oxide in the form of a freshly precipitated hydroxide are dissolved in a 2 N. potassium hydroxide solution to form the corresponding potassium aluminate.

(4) 18 parts of thorium nitrate containing 12 mols of water are dissolved in 100 parts of water.

(5) 25 parts of copper nitrate containing 3 mols of water are dissolved in 100 parts of water.

The freshly precipitated iron oxide is added to a mixture of the plumbite and aluminate solutions and thereupon the thorium nitrate and copper nitrate solutions, which have been mixed together, are added. The reaction product obtained is thoroughly pressed and dried at 80–90° C. and then broken into fragments. The product is a non-silicious base exchange body containing aluminum, lead, thorium and copper in non-exchangeable form and iron oxide in the form of a diluent.

The product is leached with dilute mineral acid or somewhat stronger organic acid, for example 10% acetic acid, in the manner described in Example 1 until part or all of the exchangeable alkali has been removed. Thereupon the contact mass is washed, dried, and filled into a converter and the mixture of ammonia and air containing 7–9% by volume of ammonia is passed over it at 600–800° C., good yields of nitrogen oxide being obtained. The leached base exchange body containing iron oxide may be considered both as an adhesive and as a stabilizer promoter which enhances the catalytic activity of the iron oxide.

Other modified contact masses may be obtained by using different component solutions, for example the aluminate and plumbite solutions may be partly or entirely replaced by corresponding amounts of other metallates such as, for example, chromites. Similarly the thorium and copper salt solutions may be partly or wholly replaced by solutions containing one or more salts of manganese, zirconium, nickel, cobalt, chromium, cerium, titanium or cadmium.

Other modified contact masses may be obtained by varying the proportions of the component solutions, but when the proportions are varied care should be taken that after the reaction is completed the base exchange bodies remain strongly alkaline to litmus and preferably neutral or alkaline to phenolphthalein.

The components used in forming the non-silicious base exchange bodies may be catalytically active or activating, or they may possess the character of stabilizer promoters. In all cases they are combined in the non-exchangeable nucleus of the complex base exchange molecule in a form in which their efficiency for the catalysis is very high.

In this example diluent bodies are embedded in the base exchange bodies by the preferred method, that is to say they are formed in situ, but undiluted base exchange bodies may also be used effectively for the oxidation of ammonia. For economical production of contact masses, however, it is advantageous to embed diluents therein. Particularly desirable diluents are those containing oxides of the metals of the iron group with or without smaller amounts of rare earth metal oxides. By the proper choice of the component solutions used in forming the contact masses it is possible to obtain products having a very great resistance to the high temperatures which are encountered in the reaction.

*Example 4*

(1) A 10% sodium aluminate solution is prepared containing 20 parts of $Al_2O_3$.

(2) 10 parts of basic copper carbonate are dissolved in 5% ammonia water to form the corresponding cuprammonium compound.

(3) A 10% solution is prepared containing a mixture of chromium and iron nitrate in which the proportion of $Cr_2O_3$ to $Fe_2O_3$ is approximately 1 to 5.

The aluminate and cuprammonium solutions are poured together and solution (3) is then added until the mother liquor of the reaction product just remains slightly alkaline to phenolphthalein. The precipitate obtained is filtered off, washed with water and dried.

The product is leached as described in the foregoing examples and is then pulverized and coated onto iron oxide granules or pieces of unglazed porcelain, using calcium or magnesium compounds as adhesives. The contact mass thus prepared is filled into a suitable converter and a mixture of ammonia and air containing 5-7% of ammonia by volume is passed over at 600-800° C., good yields of oxides of nitrogen being obtained.

The contact masses which contain vanadium, for example when a vanadite or vanadyl sulphate is a component, are well suited for the oxidation of ammonia which contains impurities such as sulphur bodies, phenolic bodies and the like, as is the case for example with ammonia produced as a by-product in the distillation of coal tar or similar tars. The impurities are oxidized to products which are harmless. The contact mass may be used as a composite contact mass and the purification and ammonia oxidation may take place simultaneously. If desired the contact mass may, however, be used as an ammonia purification contact mass as when the temperatures are maintained at a lower point, for example 400-450° C., the same contact mass, or those described in the forepart of the present or in Example 4 may be used for the second stage in which the ammonia is oxidized to nitrogen oxides, this reaction of course taking place at higher temperatures.

In the claims the term "permutogenetic" covers base exchange bodies, silicious or non-silicious, the products obtained by the acid leaching of these base exchange bodies and the salt-like bodies obtained by the reaction of these base exchange bodies with compounds the acid radicals of which are capable of reacting with the base exchange bodies to produce products which show most of the properties of salts. When so used in the claims, the term "permutogenetic" will have no other meaning.

What is claimed as new is:

1. A method of oxidizing ammonia to oxides of nitrogen, which comprises passing ammonia admixed with air at an elevated temperature over a contact mass containing an acid leached base exchange body.

2. A method of oxidizing ammonia to oxides of nitrogen, which comprises passing ammonia admixed with air at an elevated temperature over a contact mass containing an acid leached homogeneously diluted base exchange body.

3. A method according to claim 1 in which at least one of the catalytically effective components is present in the contact mass chemically combined in the base exchange body.

4. A method according to claim 1 in which at least one of the catalytically effective components is present in the contact mass chemically combined in the base exchange body in non-exchangeable form.

5. A method according to claim 2 in which at least one of the catalytically effective components is present in the contact mass chemically combined in the base exchange body.

6. A method according to claim 2 in which at least one of the catalytically effective components is present in the contact mass chemically combined in the base exchange body in non-exchangeable form.

7. A method according to claim 1 in which the contact mass contains iron oxide.

8. In the oxidation of impure ammonia containing oxidizable impurities, the step which comprises bringing about reaction between the pure ammonia and air at an elevated temperature in the presence of a contact mass containing an acid leached base exchange body which favors the selective oxidation of the impurities.

9. A method of oxidizing impure ammonia containing oxidizable impurities, which comprises passing the mixture of the ammonia and an oxygen containing gas over a contact mass which favors the selective oxidation of the impurities but which does not favor the oxidation of ammonia at the temperature used, and then passing the purified ammonia admixed with air over a contact mass favoring the oxidation of ammonia, at least one of the contact masses containing a leached permutogenetic body.

10. A method of oxidizing impure ammonia containing oxidizable impurities, which comprises passing the mixture of the ammonia and an oxygen containing gas over a contact mass which favors the selective oxidation of the impurities but which does not favor the oxidation of ammonia at the temperature used, and then passing the purified ammonia admixed with air over a contact mass favoring the oxidation of ammonia, at least one of the contact masses containing a leached diluted permutogenetic body.

11. A method of oxidizing impure ammonia containing oxidizable impurities, which comprises passing the mixture of the ammonia and an oxygen containing gas over a contact mass which favors the selective oxidation of the impurities but which does not favor the oxidation of ammonia at the temperature used, and then passing the purified ammonia admixed with air over a contact mass favoring the oxidation of ammonia, both of the contact masses containing leached permutogenetic bodies.

12. A method of oxidizing impure ammonia containing oxidizable impurities which comprises passing the mixture of the ammonia and an oxygen containing gas over a contact mass which favors the selective oxidation of the impurities but which does not favor the oxidation of ammonia at the temperature used, and then passing the purified ammonia admixed with air over a contact mass favoring the oxidation of ammonia, both of the contact masses containing leached diluted permutogenetic bodies.

13. A method according to claim 1 in which the contact mass contains a compound of vanadium.

14. A method according to claim 9 in which the contact mass for the oxidation of ammonia contains a compound of vanadium.

Signed at Pittsburgh, Pennsylvania, this 20th day of March, 1929.

ALPHONS O. JAEGER.